United States Patent
Jung (10) Patent No.: US 12,224,461 B1
(45) Date of Patent: Feb. 11, 2025

(54) BATTERY ASSEMBLY

(71) Applicant: SK On Co., Ltd., Seoul (KR)

(72) Inventor: Yong Hun Jung, Daejeon (KR)

(73) Assignee: SK ON CO., LTD., Seoul (KR)

( * ) Notice: Subject to any disclaimer, the term of this patent is extended or adjusted under 35 U.S.C. 154(b) by 0 days.

(21) Appl. No.: 18/600,772

(22) Filed: Mar. 11, 2024

(30) Foreign Application Priority Data

Aug. 10, 2023 (KR) .................. 10-2023-0104688

(51) Int. Cl.
*H01M 50/593* (2021.01)
*H01M 50/244* (2021.01)

(52) U.S. Cl.
CPC ....... *H01M 50/593* (2021.01); *H01M 50/244* (2021.01)

(58) Field of Classification Search
CPC .................. H01M 50/593; H01M 50/244
See application file for complete search history.

(56) References Cited

U.S. PATENT DOCUMENTS

| 11,909,053 B2* | 2/2024 | Cho | C08G 18/4277 |
| 2012/0003508 A1* | 1/2012 | Narbonne | H01M 50/24 |
| | | | 429/8 |
| 2019/0074557 A1* | 3/2019 | Shin | H01M 10/6553 |

FOREIGN PATENT DOCUMENTS

| KR | 10-2018-0036157 A | 4/2018 |
| KR | 10-2020-0047476 A | 5/2020 |

* cited by examiner

*Primary Examiner* — Jane J Rhee
(74) *Attorney, Agent, or Firm* — IP & T GROUP LLP (57) ABSTRACT

A battery assembly of the present disclosure includes: a plurality of battery cells each including a main body portion and an electrode tab protruding from the main body portion; a pocket member at least a part of which is disposed between an electrode tab of a first battery cell and an electrode tab of a second battery cell, among the plurality of battery cells; and an insulating member filled in an inner region of the pocket member.

9 Claims, 7 Drawing Sheets

BATTERY ASSEMBLY

CROSS-REFERENCE TO RELATED PATENT APPLICATION

The present application claims priority under 35 U.S.C. § 119 (a) to Korean patent application number 10-2023-0104688 filed on Aug. 10, 2023, in the Korean Intellectual Property Office, the entire disclosure of which is incorporated by reference herein.

BACKGROUND OF THE INVENTION

1. Field

The present disclosure relates to a secondary battery, and specifically to a battery assembly.

2. Description of the Related Art

Secondary batteries may be reused multiple times through charging and discharging. Secondary batteries are widely used across industries due to their economical and eco-friendly characteristics. A secondary battery may be divided into battery cells, battery modules, battery packs or the like depending on the unit. A battery module or battery pack may include a plurality of battery cells. A battery assembly may refer to a battery module or battery pack.

There is a demand for a method for preventing a thermal runaway phenomenon in which heat is transferred from a specific battery cell to another battery cell when the temperature of a specific battery cell in a battery assembly rises rapidly due to a chemical or physical factor.

SUMMARY OF THE INVENTION

An embodiment of the present disclosure is intended to provide a battery assembly with improved thermal stability.

The present disclosure can be widely applied in the field of green technology, such as solar power generation and wind power generation. In addition, the present disclosure can be used in eco-friendly devices such as electric vehicles and hybrid vehicles to prevent climate change by suppressing air pollution and greenhouse gas emissions.

A battery assembly according to an embodiment of the present disclosure includes: a plurality of battery cells each including a main body portion and an electrode tab protruding from the main body portion; a pocket member at least a part of which is disposed between an electrode tab of a first battery cell and an electrode tab of a second battery cell, among the plurality of battery cells; and an insulating member filled in an inner region of the pocket member.

In an embodiment, the battery assembly may further include a module case accommodating the plurality of battery cells, wherein the module case includes an upper case covering an upper end of the plurality of battery cells; and a lower case supporting a lower end of the plurality of battery cells.

In an embodiment, the insulating member may be filled in an inner region through an inlet of a pocket member inserted to a hole formed at a lower case.

In an embodiment, the electrode tab of the first battery cell and the electrode tab of the second battery cell may protrude in a first direction. Each of a plurality of battery cells may include a pin that is stacked in a second direction perpendicular to the first direction and that protrudes at a lower end of a main body portion in a third direction perpendicular to a first direction and a second direction, and wherein a lower case includes a seating portion into which a pin is inserted.

In an embodiment, a hole may be formed in a region spaced from a seating portion along a first direction.

In an embodiment, an insulating member may include a foam, wherein the foam may be cured within a reference time after being filled in an inner region.

In an embodiment, a foam may be cured in a porous state.

In an embodiment, a pocket member may be elongated by filling an insulating member.

In an embodiment, an outer surface of a pocket member may contact with an electrode tab of a first battery cell and an electrode tab of a second battery cell, and an inner surface of a pocket member may contact with an insulting member.

In an embodiment, an outer surface of a pocket member may further contact with a main body portion of a first battery cell and a main body portion of a second battery cell.

An embodiment of the present disclosure can provide a battery assembly with improved thermal stability.

An embodiment of the present disclosure can provide a battery assembly preventing a thermal runway phenomenon.

An embodiment of the present disclosure prevent reduction of electrical characteristics of a battery assembly through a pocket member.

DETAILED DESCRIPTION

The structural or functional descriptions of embodiments disclosed in the present specification or application are merely illustrated for the purpose of explaining embodiments according to the technical principle of the present invention, and embodiments according to the technical principle of the present invention may be implemented in various forms in addition to the embodiments disclosed in the specification of application. In addition, the technical principle of the present invention is not construed as being limited to the embodiments described in the present specification or application.

Figure 1A:
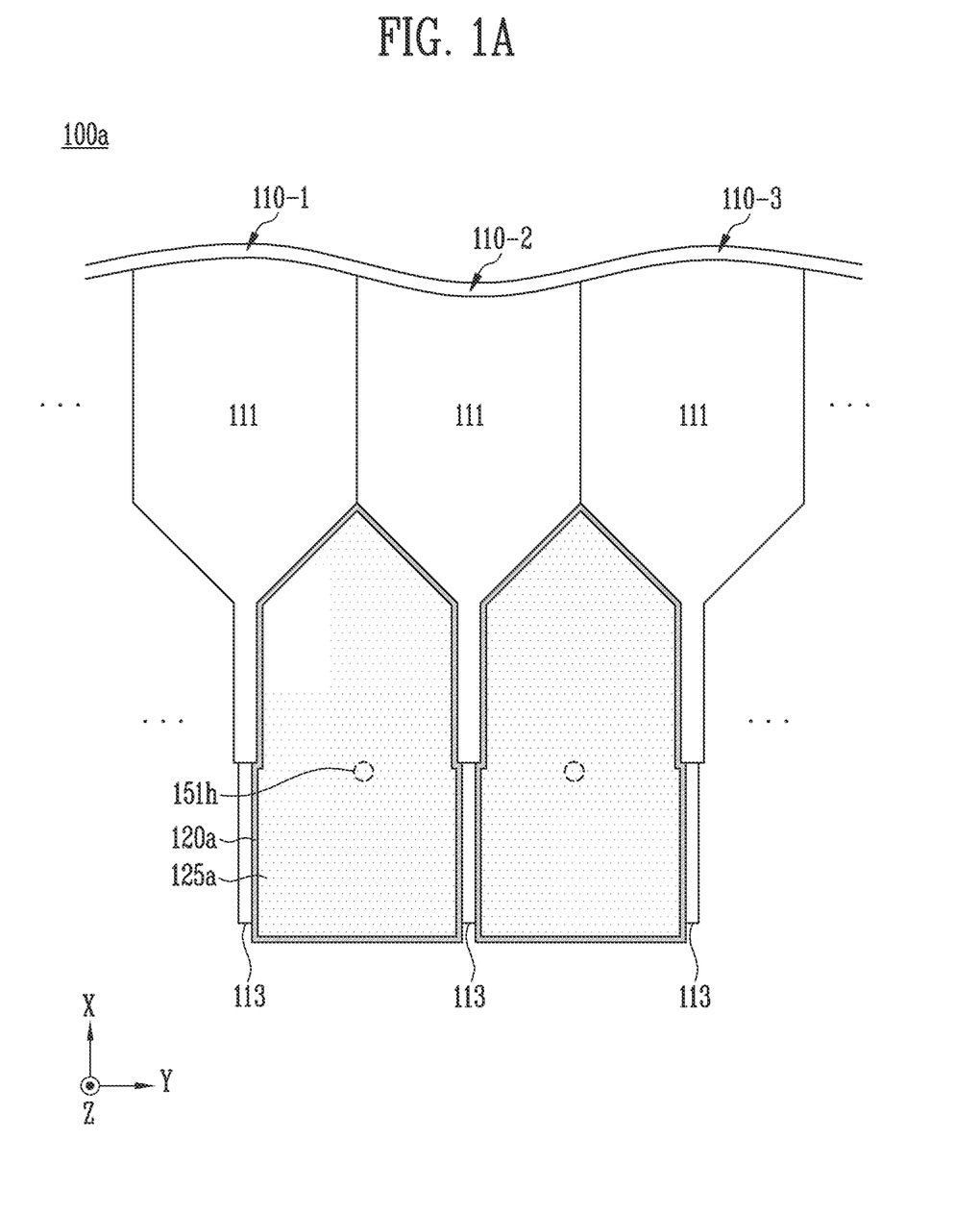
FIG. 1A shows a diagram for explaining a battery assembly including a pocket member according to an embodiment.
Figure 1B:
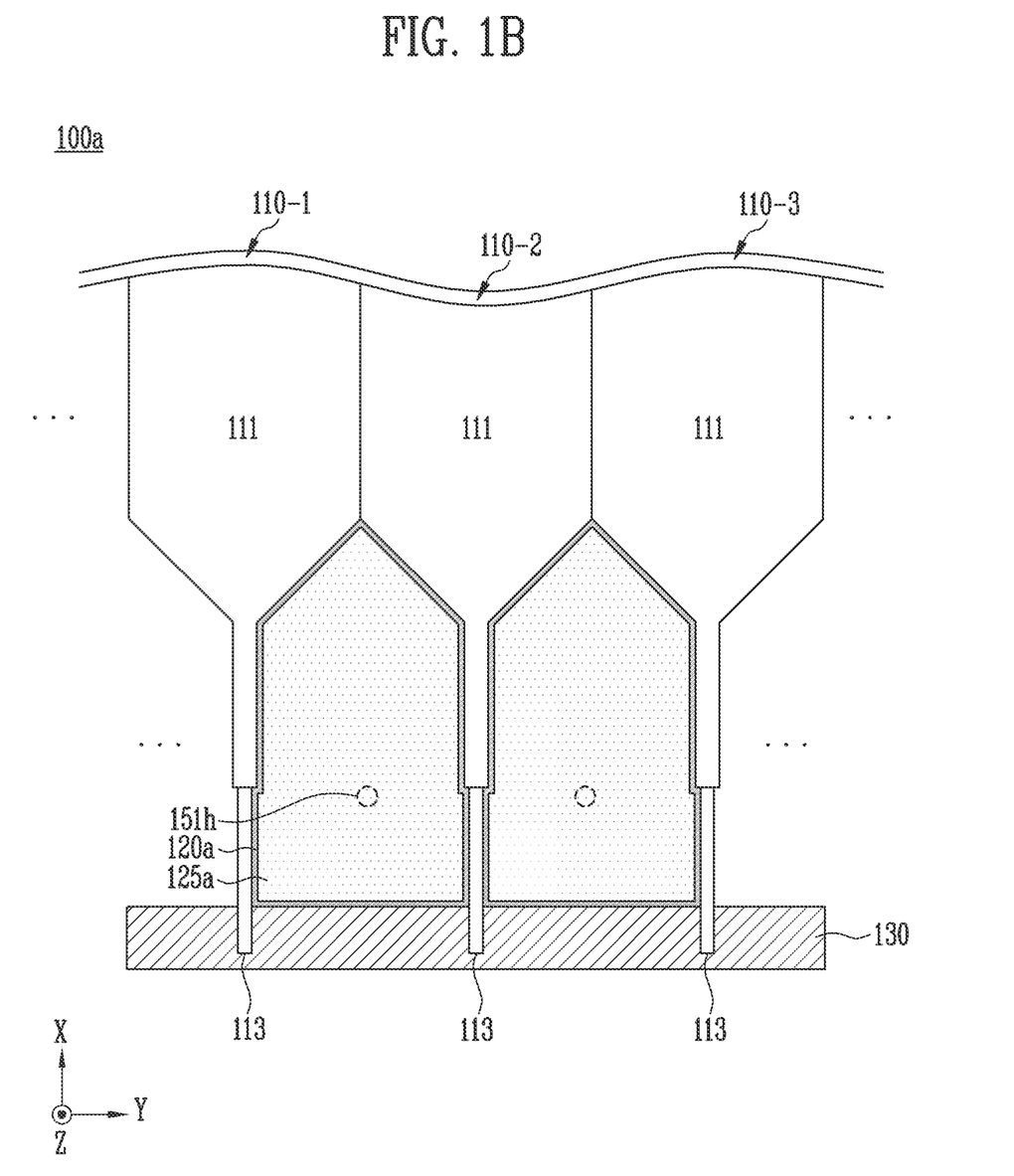
FIG. 1B shows a diagram for explaining a battery assembly including a pocket member and a busbar according to an embodiment.
Figure 2:
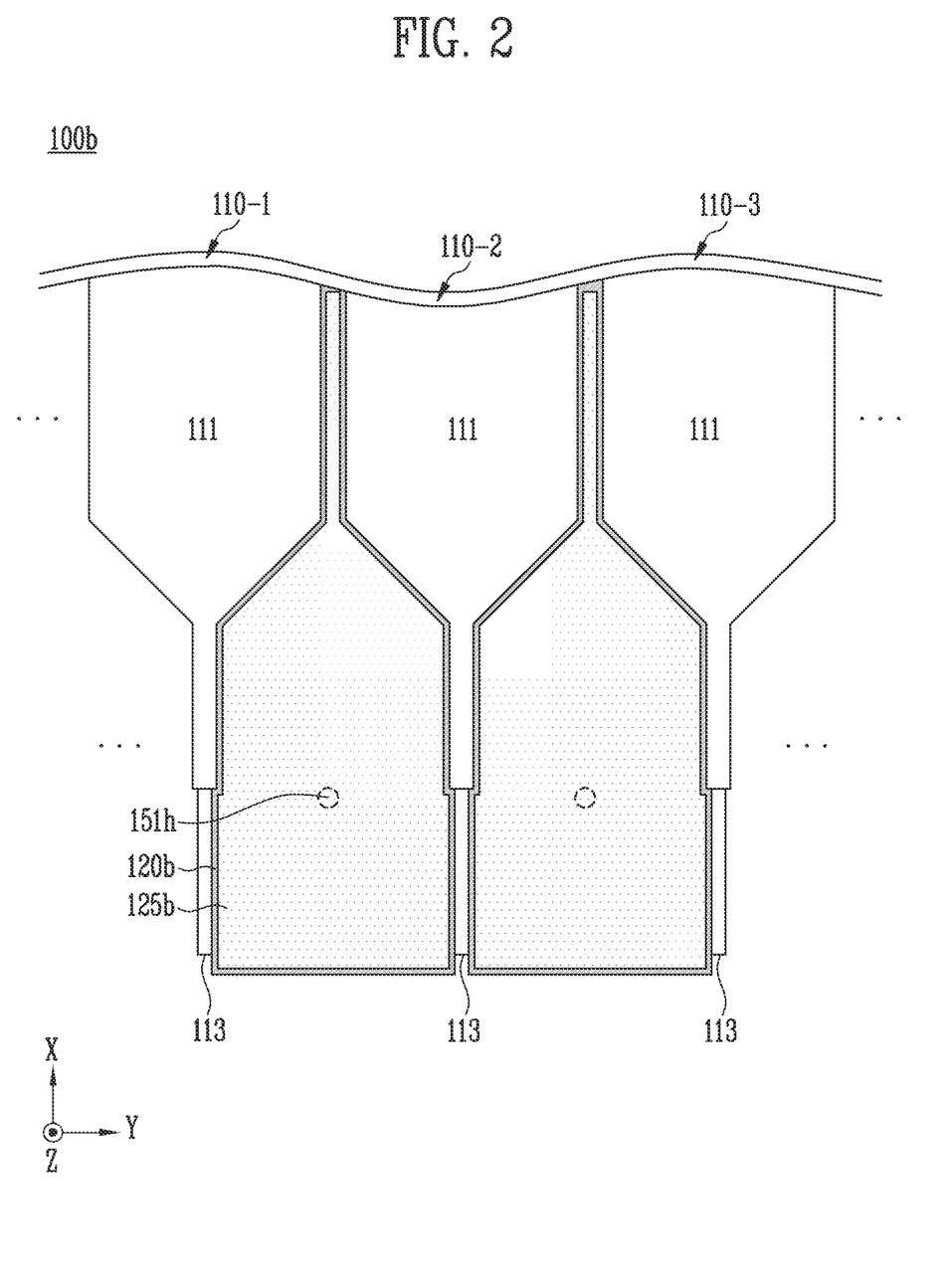
FIGS. 2 and 3 show diagrams for explaining a battery assembly including a pocket member according to another embodiment.
Figure 3:
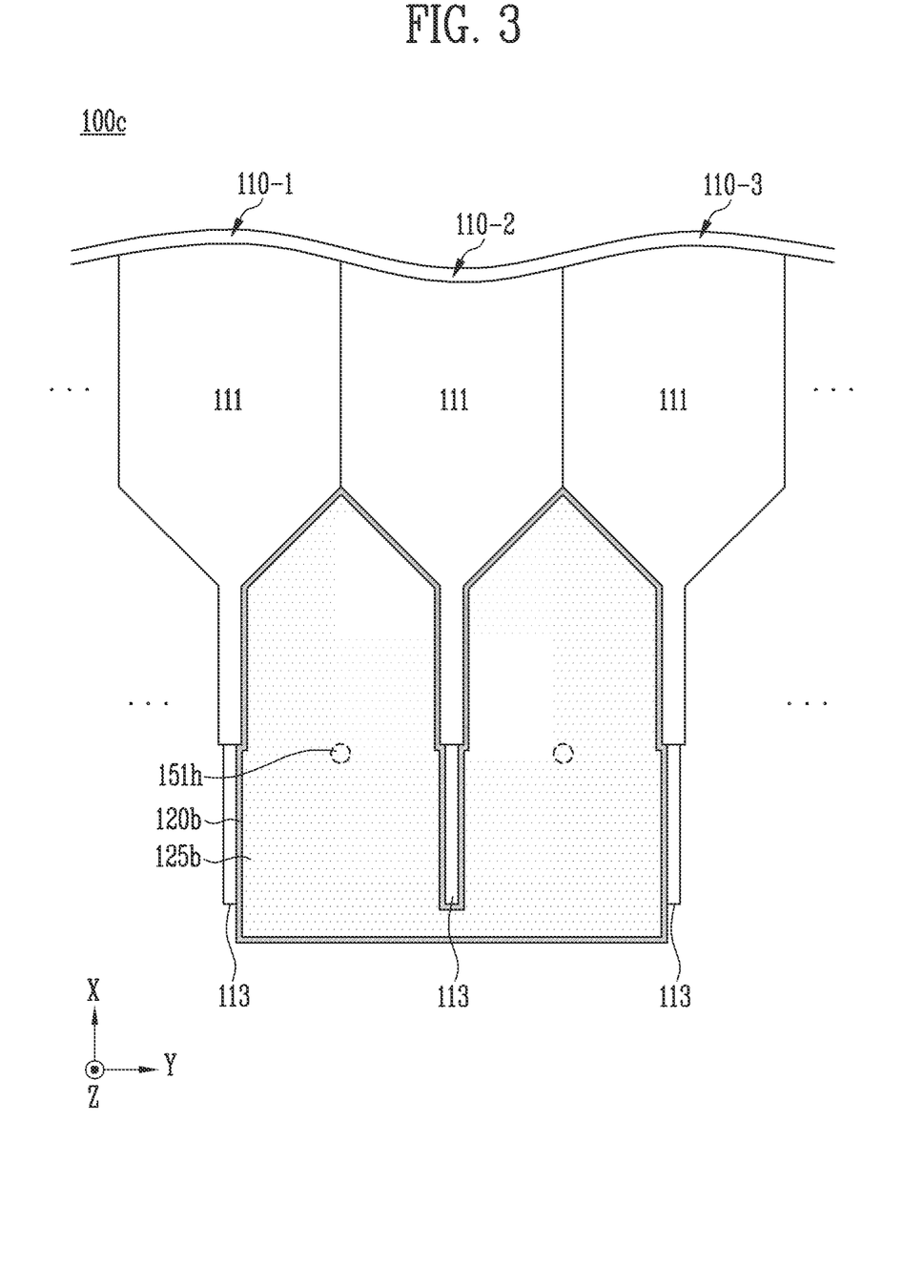

FIG. 1A shows a diagram for explaining a battery assembly including a pocket member according to an embodiment. FIG. 1B shows a diagram for explaining a battery assembly including a pocket member and a busbar according to an embodiment. FIGS. 2 and 3 show diagrams for explaining a battery assembly including a pocket member according to another embodiment. FIGS. 1A to 3 illustrate a part of a battery assembly.

Referring to FIGS. 1A to 3, a battery assembly 100*a*, 100*b*, 100*c* according to an embodiment may include: a plurality of battery cells 110-1 to 110-3, a pocket member 120a, 120b, 120c, and an insulating member 125a, 125b, 125c. A battery assembly 100a, 100b, 100c may be an energy source supplying electrical energy to an external device. In an embodiment, a battery assembly 100a, 100b, 100c may be a battery module or a battery pack. An external device may be, for example, a vehicle, a drone, a ship, a railway, an aircraft, an electric board, a smartphone, a mobile devices, or the like. In an embodiment, referring to FIG. 1B, a battery assembly 100a may include a plurality of battery cells 110-1 to 110-3 and a busbar 130. A bus bar 130 may be electrically connected to an electrode tab 113 of a plurality of battery cells 110-1 to 110-3.

Each of a plurality of battery cells 110-1 to 110-3 may include a main body portion 111 and an electrode tab 113. Meanwhile, FIGS. 1A to 3 illustrate that the number of a plurality of battery cells 110-1 to 110-3 is three, but this is only an example and may be modified to various numbers.

A main body portion 111 may include an electrode assembly. An electrode assembly may include an electrode and an electrolyte. An electrode may include a cathode and an anode. In an embodiment, an electrode assembly may further include a separator preventing contact between a cathode and an anode. In an embodiment, a main body 111 may further include an exterior material surrounding an electrode assembly. For example, an exterior material may be of various types, such as a pouch type, a prismatic type, or a cylindrical type.

An electrode tab 113 may protrude from a main body portion 111 in a first direction. For example, a first direction may be the X-axis direction. An electrode tab 113 may be electrically connected to an electrode of an electrode assembly. For example, an electrode tab 113 may include a first electrode tab electrically connected to a cathode; and a second electrode tab electrically connected to an anode.

A plurality of battery cells 110-1 to 110-3 may be stacked in a second direction. A second direction may be a direction that is perpendicular to a first direction in which an electrode tab 113 protrudes. For example, a first direction may be the X-axis direction, and a second direction may be the Y-axis direction. For a specific example, a plurality of battery cells 110-1 to 110-3 may include a first battery cell 110-1, a second battery cell 110-2, and a third battery cell 110-3. A first battery cell 110-1, a second battery cell 110-2, and a third battery cell 110-3 may be stacked in a sequence of a first battery cell 110-1, a second battery cell 110-2, and a third battery cell 110-3 along a second direction.

An insulating member 125a, 125b, 125c may suppress heat transfer from a battery cell 110-1 to 110-3 to the surroundings. An insulating member 125a, 125b, 125c may suppress heat transfer to an adjacent battery cell in the event of thermal runaway. For example, an insulating member 125a, 125b, 125c may be a member having a thermal conductivity equal to or lower than a reference value.

In an embodiment, an insulating member 125a, 125b, 125c may include a material that may be cured while being foamed. That is, an insulating member 125a, 125b, 125c may include a foam. For example, a foam may be at least one of various materials such as polyurethane foam, polystyrene foam, and polyethylene foam.

Meanwhile, when an insulating member 125a, 125b, 125c is in direct contact with an electrode tab 113 of a battery cell 110-1 to 110-3, electrical characteristics of the battery cell 110-1 to 110-3 or battery assembly 100a, 100b, 100c may deteriorate. Electrical characteristics may be insulation resistance (IR), which refers to internal resistance of a battery cell 110-1 to 110-3, or open circuit voltage (OCV). In this case, for example, IR may increase or OCV may decrease. According to the present disclosure, deterioration of electrical characteristics of a battery cell 110-1 to 110-3 or battery assembly 100a, 100b, 100c may be prevented through a pocket member 120a, 120b, 120c.

In an embodiment, an insulating member 125a, 125b, 125c may be filled in an inner region of a pocket member 120a, 120b, 120c. An inner region may be a region surrounded by a pocket member 120a, 120b, 120c. That is, a pocket member 120a, 120b, 120c may surround an insulating member 125a, 125b, 125c.

In an embodiment, an insulating member 125a, 125b, 125c may be in contact with an inner end of a pocket member 120a, 120b, 120c. That is, a pocket member 120a, 120b, 120c may surround an outer end of an insulating member 125a, 125b, 125c. As an insulating member 125a, 125b, 125c is filled, an outer end of a pocket member 120a, 120b, 120c may be in contact with a main body portion 111 or an electrode tab 113.

A pocket member 120a, 120b, 120c may be disposed between battery cells 110-1 to 110-3. For example, at least a part of a pocket member 120a, 120b, 120c may be disposed between a first battery cell 110-1 and a second battery cell 110-2. That is, at least a part of a pocket member 120a, 120b, 120c may be disposed between two battery cells that are close to each other among a plurality of battery cells 110-1 to 110-3. In an embodiment, a pocket member 120a, 120b, 120c may be disposed between battery cells 110-1 to 110-3 by filling an insulating member 125a, 125b, 125c.

In an embodiment, a pocket member 120a, 120b, 120c may be elongated by filling an insulating member 125a, 125b, 125c. To this end, a pocket member 120a, 120b, 120c may include a material that has the property of being expanded by an external force. For example, a pocket member 120a, 120b, 120c may be made of polyethylene, polypropylene, or the like.

At least a part of a pocket member 120a, 120b, 120c may be disposed between an insulating member 125a, 125b, 125c and an electrode tab 113 of a battery cell 110-1 to 110-3. In an embodiment, a pocket member 120a, 120b, 120c may be a member having electrical insulating properties of which electrical conductivity is equal to or lower than a reference value. A pocket member 120a, 120b, 120c may prevent deterioration of electrical characteristics of a battery cell 110-1 to 110-3 or battery assembly 100a, 100b, 100c. In an embodiment, the thickness of a pocket member 120a, 120b, 120c may be equal to or less than a reference value. This is to maintain insulation properties of an insulating member 125a, 125b, 125c.

At least one pocket member 120a, 120b, 120c may be disposed in a region between a plurality of battery cells 110-1 to 110-3. For example, referring to FIGS. 1A and 2, a pocket member 120a, 120b may be disposed such that one pocket member 120a, 120b covers one of the regions between battery cells 110-1 to 110-3. In another example, referring to FIG. 3, a pocket member 120c may be arranged so that one pocket member 120c covers two of the regions between battery cells 110-1 to 110-3. However, these are only examples, and the number of regions covered by one pocket member may be varied in various ways.

At least a part of a pocket member 120a, 120b, 120c may be disposed between an electrode tab 113 of a first battery cell 110-1 and an electrode tab 113 of a second battery cell 110-2. Here, a first battery cell 110-1 and a second battery cell 110-2 may be neighboring battery cells with a shortest distance therebetween. In an embodiment, an outer surface of a pocket member 120a, 120b, 120c may contact an electrode tab 113 of a first battery cell 110-1 and an electrode tab 113 of a second battery cell 110-2. An inner surface of a pocket member 120a, 120b, 120c may contact an insulating member 125a, 125b, 125c.

At least a part of a pocket member 120a, 120b, 120c may be disposed between a main body portion 111 of a first battery cell 110-1 and a main body portion 111 of a second battery cell 110-2. In an embodiment, an outer surface of a pocket member 120a, 120b, 120c may further contact a main body portion 111 of a first battery cell 110-1 and a main body portion 111 of a second battery cell 110-2.

In an embodiment, referring to FIG. 2, a main body portion 111 of a first battery cell 110-1 and a main body portion 111 of a second battery cell 110-2 may be spaced apart from each other in a second direction so that a gap may exist. In this case, a part of a pocket member 120b may be inserted into the gap.

In an embodiment, referring to FIG. 3, at least a part of a pocket member 120c may be disposed between an electrode tab 113 of a second battery cell 110-2 and an electrode tab 113 of a third battery cell 110-3. Here, a second battery cell 110-2 and a third battery cell 110-3 may be neighboring battery cells with a shortest distance therebetween.

Figure 4:
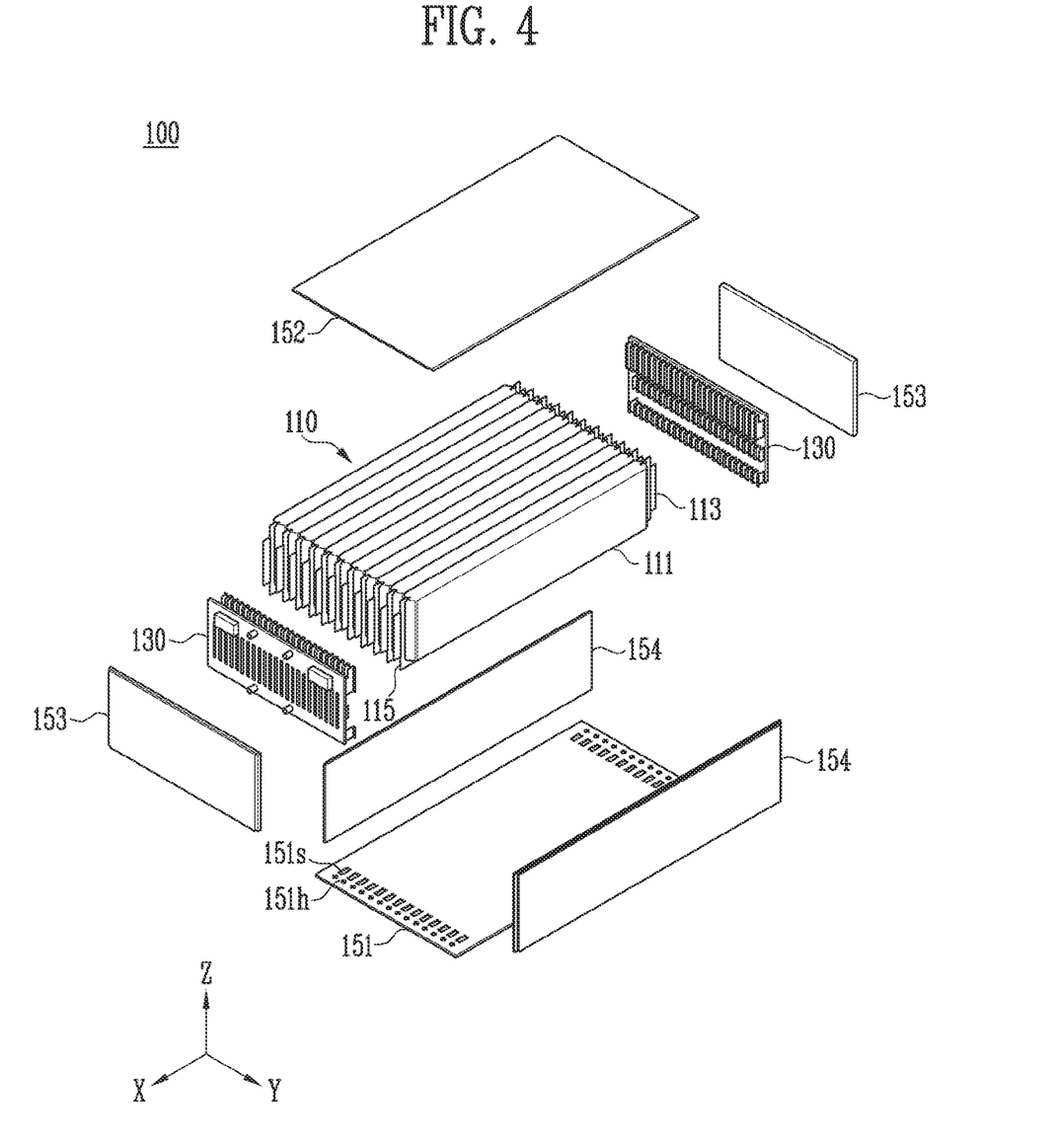
FIG. 4 shows an exploded diagram of a battery assembly in a state before an insulating member is filled according to the embodiment.

FIG. 4 shows an exploded diagram of a battery assembly in a state before an insulating member is filled according to the embodiment.

Referring to FIG. 4, a battery assembly 100 may include a plurality of battery cells 110, a busbar 130, and a module case.

Each of a plurality of battery cells 110 may include a main body portion 111 and an electrode tab 113. An electrode tab 113 may include a first electrode tab connected to a cathode of a battery cell 110 and a second electrode tab connected to an anode of a battery cell 110. The description of a battery cell 110 will be omitted as it overlaps with the above description.

A busbar 130 may be electrically connected to an electrode tab 113 of a plurality of battery cells 110. For example, a busbar 130 may include a first busbar and a second busbar. A first busbar may be connected to a first electrode tab of a battery cell 110, and a second busbar may be connected to a second electrode tab of a battery cell 110. A plurality of battery cells 110 may be electrically connected through a busbar 130.

A module case may accommodate a plurality of battery cells 110. In an embodiment, a module case may accommodate a busbar 130.

A module case may include a lower case 151 and an upper case 152. A plurality of battery cells 110 may be disposed between a lower case 151 and an upper case 152. A lower case 151 may support a lower end of a plurality of battery cells 110, and an upper case 152 may cover an upper end of a plurality of battery cells 110. A lower case 151 may include a seating portion 151s and a hole 151h. A seating portion 151s may be a recessed part with a height lower than that of the surroundings. A hole 151h may be a part formed by penetrating an inner area of a pocket member to fill an insulating member.

In an embodiment, a module case may further include at least one of a side plate 153 and an end plate 154. A side plate 153 and an end plate 154 may be coupled with a lower case 151 and an upper case 152. A side plate 153 may be disposed on an outer end of a busbar 130 in a first direction in which an electrode tab 113 protrudes. For example, a first direction may be the X-axis direction. An end plate 154 may be disposed on an outer end of a plurality of battery cells 110 in a second direction in which the plurality of battery cells 110 are stacked. For example, a second direction may be the Y-axis direction perpendicular to a first direction.

In an embodiment, a battery cell 110 may include a pin 115. A pin 115 may protrude from a lower end of a main body portion 111 in a third direction. For example, a third direction may be the Z-axis direction perpendicular to a first direction and a second direction. A plurality of battery cells 110 may be stacked and disposed on a lower case 151 in a second direction. At this time, a pin 115 of a plurality of battery cells 110 may be inserted into a seating portion 151s of a lower case 151.

Figure 5:
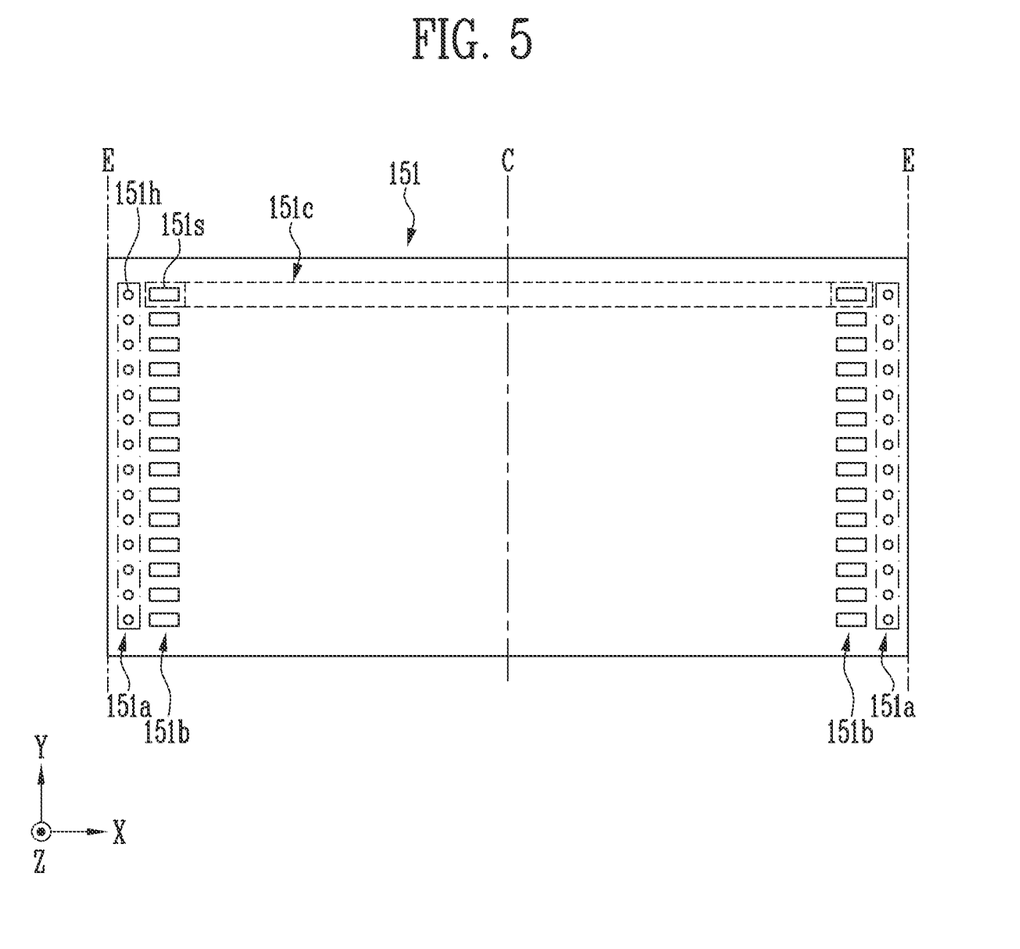
FIG. 5 shows a diagram for explaining a lower case according to an embodiment.

FIG. 5 shows a diagram for explaining a lower case according to an embodiment.

Referring to FIG. 5, a lower case 151 may include a plurality of cell regions 151c. A cell region 151c may be a region in which a battery cell is disposed. A cell region 151c may be disposed in a plural number in a second direction, which is a stacking direction of battery cells. For example, a second direction may be the Y-axis direction.

A cell region 151c may include a seating portion 151s. A seating portion 151s may be a recessed part into which a pins of a battery cells may be inserted. A seating portion 151s may be formed in a plural number in a second direction. In an embodiment, a plurality of seating portions 151s may be formed as a single seating integrally connected assembly 151b.

A seating portion 151s may be formed in a region between a center C and an edge E of a lower case 151 along a first direction in which an electrode tab of a battery cell protrudes. For example, a first direction may be the X-axis direction.

In an embodiment, a lower case 151 may include at least one hole 151h. A hole 151h may be a part formed by penetrating an inner region of a pocket member to fill an insulating member. A hole 151h may be formed in a region 151a spaced apart from a seating portion 151s along a first direction. A region 151a spaced apart along a first direction may be a region between a region in which a seating portion 151s of a lower case 151 is formed and an edge E. In an embodiment, a hole 151h may be formed in a plural number in a second direction within a region 151a.

Figure 6:
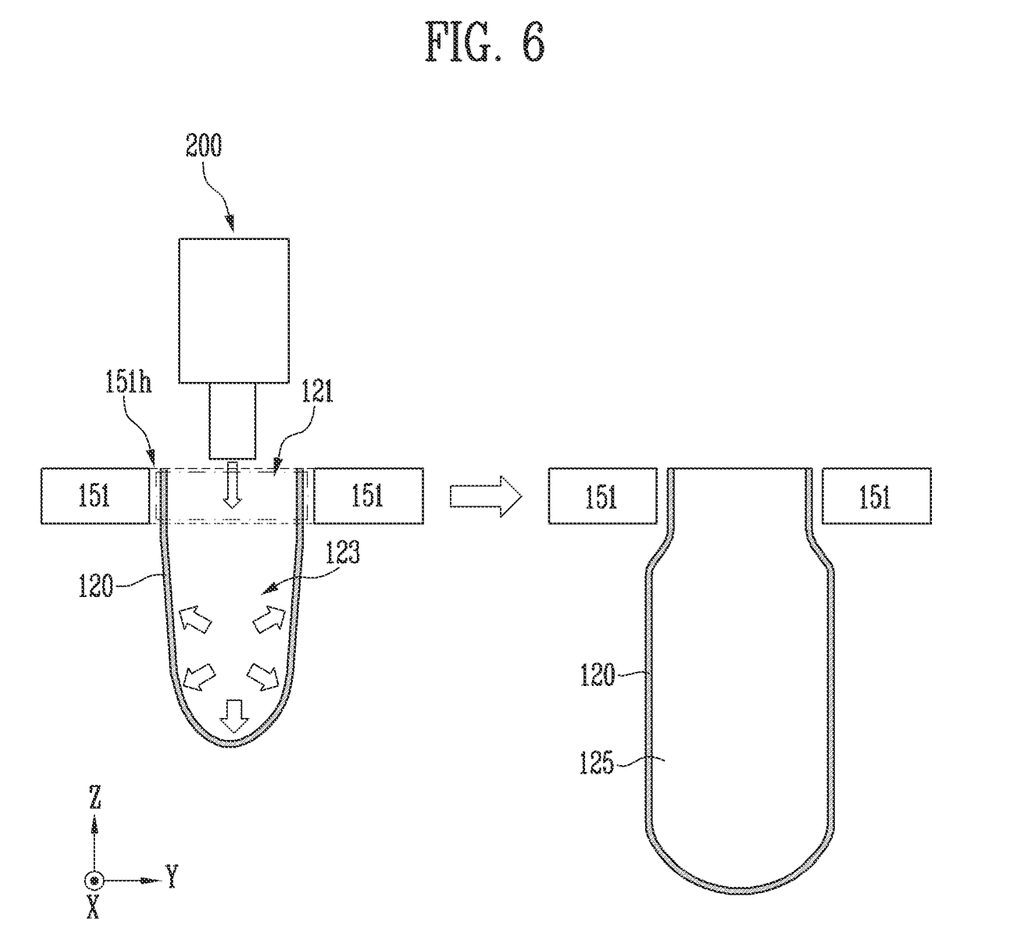
FIG. 6 shows a diagram for explaining an insulating member filled in a pocket member through a lower case according to an embodiment.

FIG. 6 shows a diagram for explaining an insulating member filled in a pocket member through a lower case according to an embodiment.

Referring to FIGS. 4 to 6, an inlet 121 of a pocket member 120 may be inserted into a hole 151h of a lower case 151 of a battery assembly 100. Other parts of a pocket member 120 may be positioned in an internal space of a module case.

An insulating member 125 may be filled into an inner region 123 of a pocket member 120 through an inlet 121 of a pocket member 120. In an embodiment, an insulating member 125 may be filled into an inner region 123 of a pocket member 120 by an injecting device 200.

A pocket member 120 may have a shape corresponding to an internal space of a module case by filling an insulating member 125. In other words, a pocket member 120 may fill more empty regions of an internal space, as an insulating member 125 is filled.

In an embodiment, a pocket member 120 may be elongated by filling an insulating member 125. In other words, the length of a pocket member 120 may increase, as an insulating member 125 is filled.

In an embodiment, an insulating member 125 may be formed by curing a foam within a reference time after the foam is filled in an inner region 123 of a pocket member 120. For example, a reference time may be a time designed to be 1 hour, 2 hours, or the like.

In an embodiment, an insulating member 125 may be formed by curing a foam in a porous state. For example, a porous state may be a state in which fine pores are partially formed on a surface or inside of a material.

What is claimed is:

1. A battery assembly comprising:
   a plurality of battery cells each including a main body portion and an electrode tab protruding from the main body portion;
   a pocket member at least a part of which is disposed between an electrode tab of a first battery cell and an electrode tab of a second battery cell, among the plurality of battery cells; and
   an insulating member accommodated in an inner region of the pocket member,
   wherein the pocket member comprises:
   an outer surface facing the electrode tab of the first battery cell and the electrode tab of the second battery cell; and
   an inner surface contacting the insulating member.

2. The battery assembly according to claim 1, further comprising a module case accommodating the plurality of battery cells,
   wherein the module case includes an upper case covering an upper end of the plurality of battery cells; and a lower case supporting a lower end of the plurality of battery cells.

3. The battery assembly according to claim 2, wherein the insulating member is accommodated in the inner region through an inlet of the pocket member inserted to a hole formed at the lower case.

4. The battery assembly according to claim 3, wherein the electrode tab of the first battery cell and the electrode tab of the second battery cell protrude in a first direction,
   wherein each of the plurality of battery cells includes a pin that is stacked in a second direction perpendicular to the first direction and that protrudes at a lower end of the main body portion in a third direction perpendicular to the first direction and the second direction, and
   wherein the lower case includes a seating portion into which the pin is inserted.

5. The battery assembly according to claim 4, wherein the hole is formed in a region spaced from the seating portion along the first direction.

6. The battery assembly according to claim 1, wherein the insulating member includes a foam, and
   wherein the foam is cured within a reference time after being filled in the inner region.

7. The battery assembly according to claim 6, wherein the foam is cured in a porous state.

8. The battery assembly according to claim 1, wherein the pocket member is elongated by filling the insulating member.

9. The battery assembly according to claim 1, wherein the outer surface of the pocket member further contacts with a main body portion of the first battery cell and a main body portion of the second battery cell.

* * * * *